(12) United States Patent
Gu (10) Patent No.: US 11,506,456 B2
(45) Date of Patent: Nov. 22, 2022

(54) MODULAR COOLING TOWER

(71) Applicant: Tae-June Gu, Incheon (KR)

(72) Inventor: Tae-June Gu, Incheon (KR)

( * ) Notice: Subject to any disclaimer, the term of this patent is extended or adjusted under 35 U.S.C. 154(b) by 62 days.

(21) Appl. No.: 17/298,719

(22) PCT Filed: Nov. 22, 2019

(86) PCT No.: PCT/KR2019/016107
§ 371 (c)(1),
(2) Date: Jun. 1, 2021

(87) PCT Pub. No.: WO2020/116834
PCT Pub. Date: Jun. 11, 2020

(65) Prior Publication Data
US 2022/0049902 A1   Feb. 17, 2022

(30) Foreign Application Priority Data

Dec. 3, 2018 (KR) .......................... 10-2018-0153376

(51) Int. Cl.
*F28C 1/02* (2006.01)
*F28C 1/16* (2006.01)

(52) U.S. Cl.
CPC . *F28C 1/02* (2013.01); *F28C 1/16* (2013.01)

(58) Field of Classification Search
CPC ..... F28C 1/02; F28C 1/16; F28F 25/12; F28F 2250/02

(Continued)

(56) References Cited

U.S. PATENT DOCUMENTS 1,732,963 A * 10/1929 Burhorn .................. F28F 25/12
                                                       62/310
2,915,302 A * 12/1959 Jacir ......................... D04B 1/10
                                                       261/109

(Continued)

FOREIGN PATENT DOCUMENTS

DE        1235343    *  3/1967
GB         263114    *  8/1927

(Continued)

OTHER PUBLICATIONS

Search Report, dated Mar. 16, 2020 for International Application No. PCT/KR2019/016107.

(Continued)

*Primary Examiner* — Charles S Bushey
(74) *Attorney, Agent, or Firm* — LRK Patent Law Firm (57) ABSTRACT

The present invention relates to a cooling tower for cooling water, improved to evenly spray the cooling-water, wherein each component is manufactured in a modularized form and then each module is integrated and installed at an installation site to correspond to the scale of the cooling tower. The cooling tower includes a water tank, a filling material, a cooling-water circulation facility, an eliminator, and a fan, wherein, between the filling material and the water tank, an air intake port through which external air is introduced and a guide having a concave cross-sectional shape to guide the introduced air to the center using a pressure difference between the inside and the outside thereof are additionally provided so that cooling efficiency of the cooling-water can be improved and productivity of the cooling tower as well as convenience in transportation and installation can be maximized.

5 Claims, 8 Drawing Sheets (58) Field of Classification Search
USPC .......................................... 261/30, DIG. 11
See application file for complete search history.

(56) References Cited

U.S. PATENT DOCUMENTS

| | | | | |
|---|---|---|---|---|
| 3,437,319 | A * | 4/1969 | Engalitcheff, Jr. et al. | ................. F28F 25/12 261/DIG. 11 |
| 3,494,109 | A * | 2/1970 | Blazer | ................. F28C 1/00 261/DIG. 11 |
| 4,781,869 | A * | 11/1988 | Wiltz | ................. F28C 1/02 261/DIG. 11 |
| 5,227,095 | A * | 7/1993 | Curtis | ................. F28C 1/02 261/DIG. 85 |
| 6,499,728 | B2 * | 12/2002 | Menzel | ................. F28F 25/12 261/DIG. 11 |
| 8,196,908 | B2 * | 6/2012 | Lee | ................. F28C 1/02 261/DIG. 11 |
| 8,585,024 | B2 * | 11/2013 | Ferree | ................. F28F 27/02 261/DIG. 11 |
| 2012/0118513 | A1 * | 5/2012 | Melhuish | ................. F28F 25/12 292/195 |
| 2017/0037650 | A1 | 2/2017 | Maurer et al. | |

FOREIGN PATENT DOCUMENTS

| | | | |
|---|---|---|---|
| GB | 1557958 | * | 12/1979 |
| KR | 10-0956357 | B1 | 5/2010 |
| KR | 10-1483195 | B1 | 1/2015 |
| KR | 10-1483200 | B1 | 1/2015 |
| KR | 10-1620625 | B1 | 5/2016 |
| KR | 10-1645960 | B1 | 8/2016 |
| KR | 10-1862556 | B1 | 7/2018 |
| KR | 10-2030664 | B1 | 10/2019 |
| WO | WO 2010/000212 A1 | * | 1/2010 |

OTHER PUBLICATIONS

Written Opinion, dated Mar. 16, 2020 for International Application No. PCT/KR2019/016107.

* cited by examiner

MODULAR COOLING TOWER

CROSS-REFERENCE TO RELATED APPLICATIONS

The present application is a U.S. National Phase entry from International Application No. PCT/KR2019/016107, filed Nov. 22, 2019, which claims priority to Korean Patent Application No. 10-2018-0153376, filed Dec. 3, 2018, the disclosure of which is incorporated by reference herein in their entirety.

TECHNICAL FIELD

The present invention relates to a modular cooling tower, and more particularly, to a cooling tower for cooling cooling-water, improved to evenly spray the cooling-water, wherein each component is manufactured in a modularized form and then each module is integrated and installed at an installation site to correspond to the scale of the cooling tower, so that cooling efficiency of the cooling-water can be improved and productivity of the cooling tower as well as convenience in transportation and installation can be maximized.

BACKGROUND ART

In general, various industrial sites, including thermoelectric power plants or chemical plants, require a large amount of cooling-water for cooling facilities, but it is difficult to continuously supply the large amount of cooling-water and subsequently to discharge the cooling-water in a simple manner.

For this reason, it is common to provide a separate cooling-water circulation facility so as to cool cooling-water at an elevated temperature and subsequently recirculate the cooling-water, and a cooling tower has been widely used to perform such circulation type cooling for the cooling-water.

The cooling tower causes high-temperature cooling-water to be brought into contact with air so as to evaporate a portion of the cooling-water, so that latent heat for the evaporation thereof is used to reduce the temperature of the cooling-water. Cooling towers may be classified into a counter-flow type and a cross-flow type depending on a heat-exchanging method, and may also be classified into a natural air supply type and a forced air supply type depending on an external air supply method.

Figure 1:
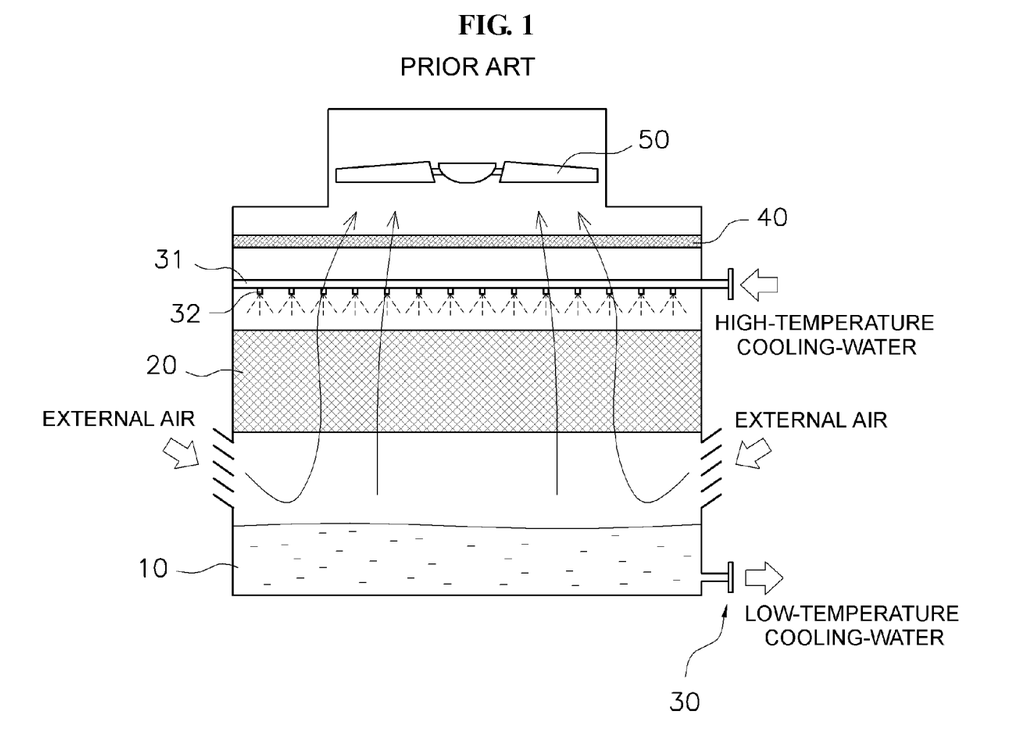
FIG. 1 is a front cross-sectional view illustrating a conventional cooling tower.

FIG. 1 is a front cross-sectional view illustrating a conventional cooling tower. The conventional cooling tower includes, when viewed upward from a bottom installation surface as illustrated in FIG. 1, a water tank 10 being capable of storing cooling-water therein, a filling material 20 for performing heat exchange between the cooling-water and air, a cooling-water circulation facility 30 provided with nozzles 32 for spraying the cooling-water from a pipe 31, an eliminator 40 for collecting moisture entrained in condensed air, and a fan 50 for discharging air, which has passed through the eliminator 40, to the outside.

With this configuration of the conventional cooling tower, when high-temperature cooling-water circulated through the cooling-water circulation facility 30 is sprayed downward through the nozzles 32 from the pipe 31, the sprayed high-temperature cooling-water passes downward through the filling material 20.

At this time, introduced external air, which has passed through air intake ports formed in sidewalls of the cooling tower below the filling material 20, passes through the filling material 20 and then rises upward.

Accordingly, the high-temperature cooling-water and the low-temperature external air are subjected to heat exchange with each other within the filling material 20; moisture entrained in the air, which has passed through the filling member 20 and rises upward, is then removed in the eliminator 40; and the resulting air is then discharged to the outside through the fan 50.

The low-temperature cooling-water that has been cooled due to evaporative latent heat is collected in the water tank 10, and is sent back to the cooling-water circulation facility 30 so as to be re-circulated.

The conventional cooling tower configured and operated as described above has several technical problems as follows:

First, it was difficult to supply external air to a central portion of the cooling tower.

In other words, in the conventional cooling tower wherein the external air is introduced through the air intake ports formed in the sidewalls below the filling material 20, most of the external air introduced as such directly rises and only an extremely small amount of the external air reaches the central portion of the cooling tower.

Accordingly, smooth heat exchange is performed mutually between the cooling-water and the external air at a peripheral portion of the filling material 20 in the cooling tower, whereas heat exchange is hardly performed at an approximately central portion of the filling material 20 in the cooling tower. Thus, overall cooling efficiency of the cooling tower is lowered.

Second, after manufacture of the cooling tower, it was difficult to transport or install the cooling tower to or at an installation site.

Depending on cooling capacities required for cooling towers, the cooling towers have been manufactured in various scales ranging from a small one having a height or length of less than a few meters to a large one having a height or length of several tens of meters, if necessary.

For this reason, after the cooling tower is produced by a manufacturer, it was difficult to transport the cooling tower to an installation site; and even if the cooling tower has been transported to the installation site, many difficulties in installing the cooling tower have occurred.

Third, when a separate duct for supplying external air to the central portion of the cooling tower is disposed, there is a concern that a region where the cooling-water does not reach may be created below the duct.

That is, when an additional duct is provided, the duct obstructs the cooling-water which is falling down, so that the region where the cooling-water does not reach may be created below the duct, whereby heat exchange is not performed in a portion of the filling material placed in this region, resulting in a limitation on increase of the cooling efficiency of the cooling-water.

DISCLOSURE

Technical Problem

The present invention is conceived to solve the above problems. An object of the present invention is to provide a modular cooling tower, wherein cooling efficiency of cooling-water is improved by enabling the cooling-water to be spayed even onto a region where the cooling-water was not evenly sprayed in a conventional cooling tower, and each component is manufactured in a modularized form and then each module is integrated and installed at an installation site to correspond to the scale of the cooling tower, so that the cooling efficiency of the cooling-water can be further improved and productivity of the cooling tower as well as convenience in transportation and installation can be maximized.

Technical Solution

The present invention is achieved by a modular cooling tower including, when viewed upward from an installation surface, a water tank being capable of storing cooling-water therein, a filling material for performing heat exchange between the cooling-water and air, a cooling-water circulation facility provided with nozzles for spraying the cooling-water downward from a pipe, an eliminator for collecting moisture entrained in condensed air, and a fan for discharging air having passed through the eliminator to the outside, wherein the modular cooling tower further includes, between the filling material and the water tank, air intake ports formed in a sidewall of the cooling tower so as to allow external air to be introduced into the cooling tower; and guides having a concave cross-sectional shape and installed to extend along a direction of opening of the air intake ports, wherein a lower surface of each of the guides is configured to bisect air flowing upward and an upper surface of each of the guides is configured to guide the air introduced through the air intake ports to a central portion of the cooling tower by using a pressure difference between the inside and the outside of the guide.

Here, it is preferred that each of the guides is further provided with spraying means for spraying the cooling-water falling into the inside of the guide and collected by the upper surface to a region below the lower surface of the guide.

Moreover, it is preferable that the spraying means are configured to spray the cooling-water to rectangular or elliptical spray regions having major axes parallel to the installation direction of the guides.

Furthermore, it is preferred that the modular cooling tower includes at least one first module including a quadrilateral pillar-shaped frame and having the water tank constructed in a segmented form in the frame; at least one second module including a quadrilateral pillar-shaped frame and having the filling material, the guides and the air intake ports provided in the frame; and at least one third module including a quadrilateral pillar-shaped frame and having the cooling-water circulation facility constructed in a segmented form and the eliminator in the frame.

Particularly, it would be preferred that the first module, the second module, and the third module include horizontal coupling means for allowing two or more first modules, second modules, or third modules arranged in a horizontal direction to be couplable to one another; and the first module, the second module, and the third module include vertical coupling means for allowing the first modules, second modules, and third modules arranged on top of another in a vertical direction to be couplable to one another.

Advantageous Effects

With the configurations of the present invention described above, the cooling efficiency of the cooling-water is improved by enabling the cooling-water to be spayed even onto a region where the cooling-water was not evenly sprayed in a conventional cooling tower, and each component is manufactured in a modularized form and then each module is integrated and installed at an installation site to correspond to the scale of the cooling tower, so that the cooling efficiency of the cooling-water can be further improved and productivity of the cooling tower as well as convenience in transportation and installation can be maximized.

BEST MODEL

Figure 2:
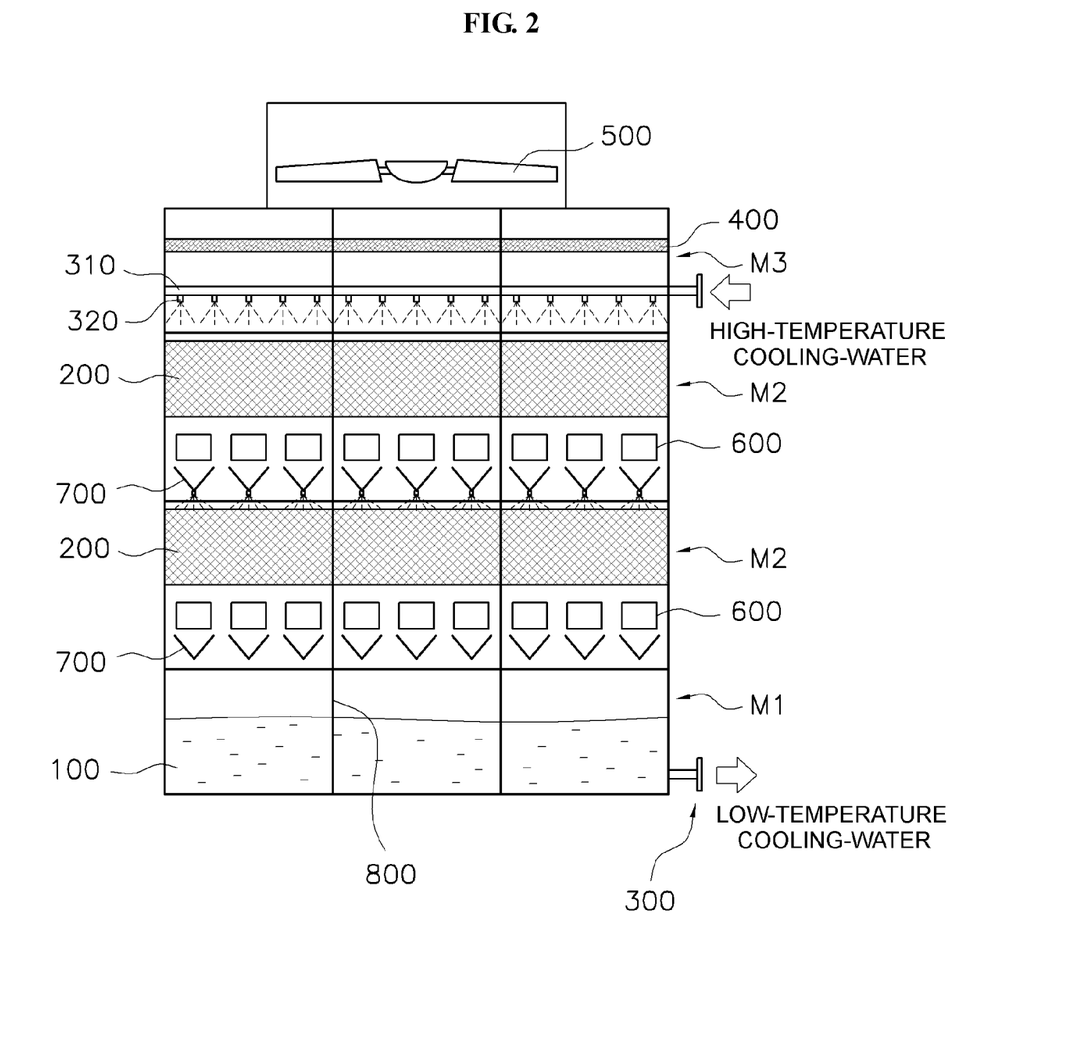
FIG. 2 is a front cross-sectional view illustrating a modular cooling tower of the present invention.
Figure 3:
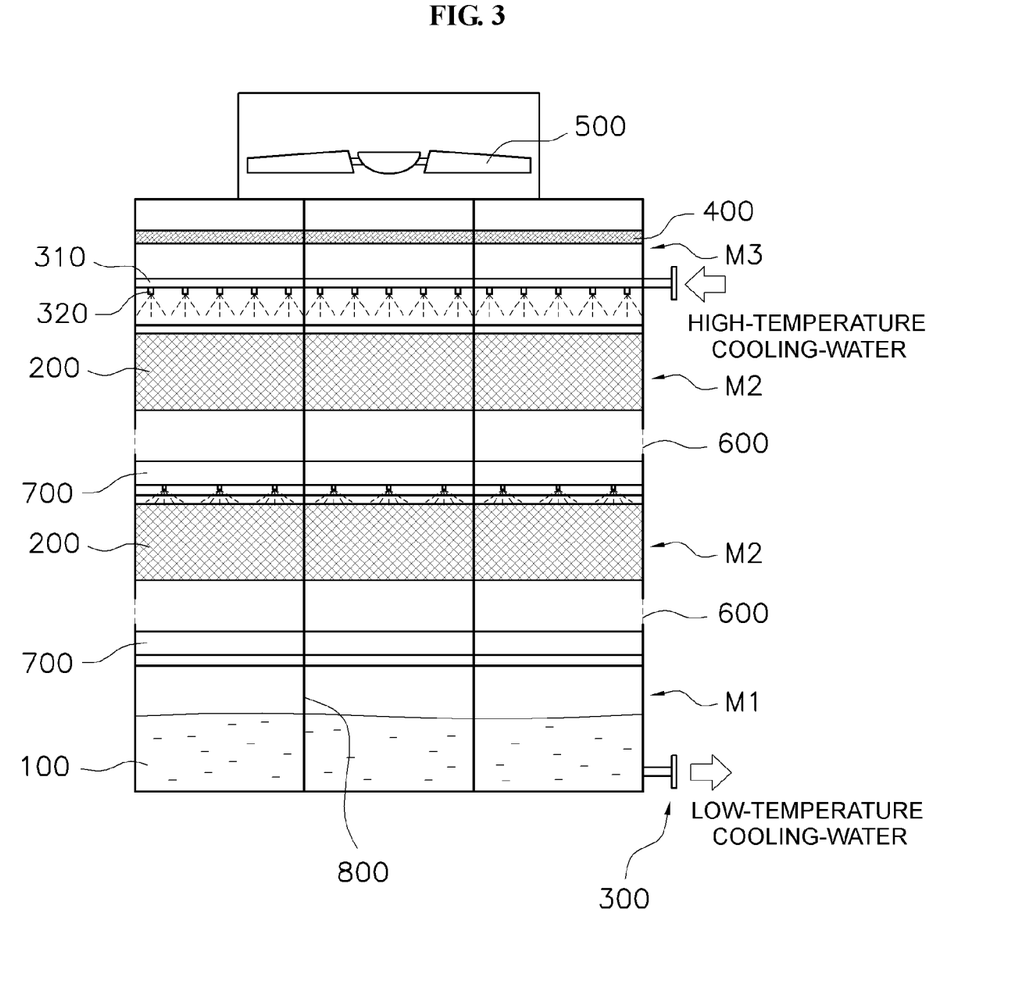
FIG. 3 is a side cross-sectional view illustrating the modular cooling tower of the present invention.
Figure 4:
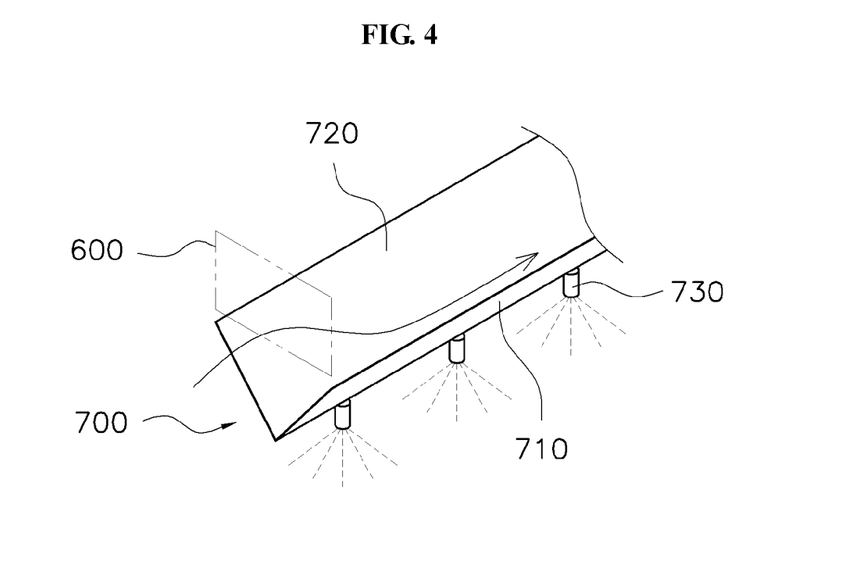
FIG. 4 is a perspective view illustrating a guide in the modular cooling tower of the present invention.

FIG. 2 is a front cross-sectional view illustrating a modular cooling tower of the present invention, FIG. 3 is a side cross-sectional view illustrating the modular cooling tower of the present invention, and FIG. 4 is a perspective view illustrating a guide in the modular cooling tower of the present invention.

Figure 5:
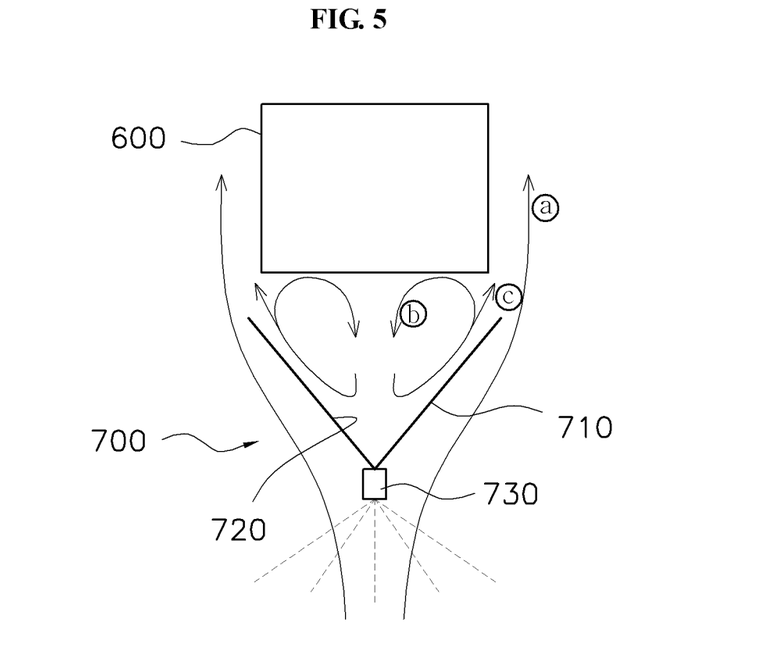
FIG. 5 is an enlarged front cross-sectional view of a main part of the modular cooling tower of the present invention, illustrating air intake ports and the guide in the modular cooling tower.
Figure 6:
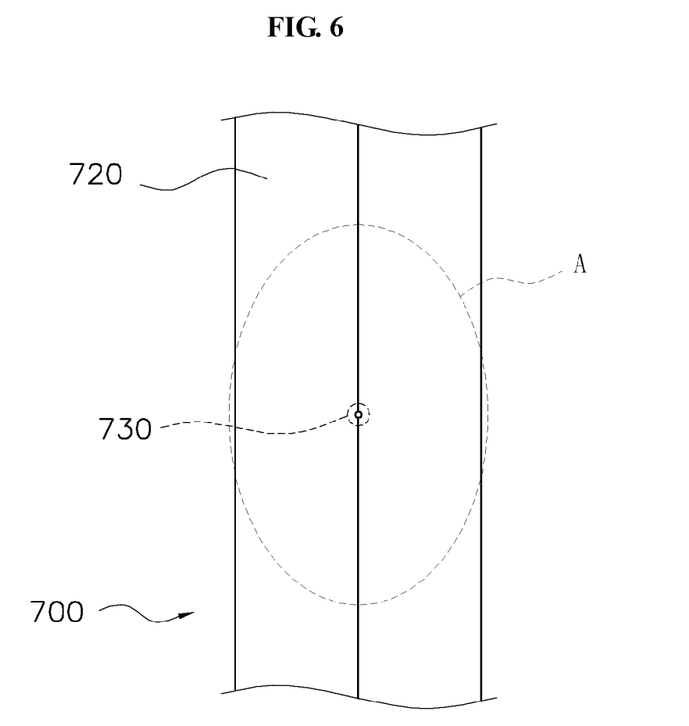
FIG. 6 is a plan view illustrating the guide in the modular cooling tower of the present invention.

Further, FIG. 5 is an enlarged front cross-sectional view of a main part of the modular cooling tower of the present invention, illustrating air intake ports and the guide in the modular cooling tower, and FIG. 6 is a plan view illustrating the guide in the modular cooling tower of the present invention.

Figure 7:
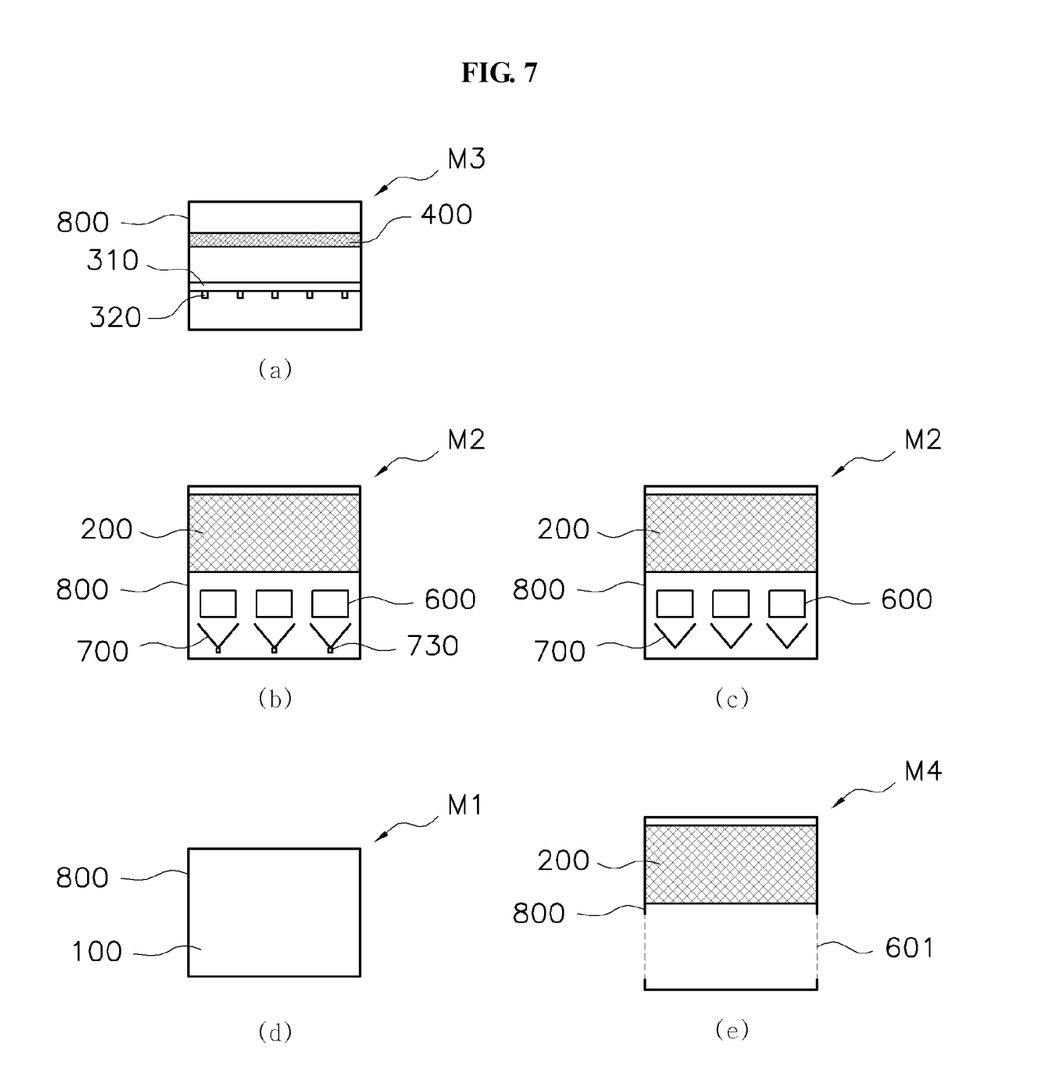
FIG. 7 is front cross-sectional views illustrating respective modules in the modular cooling tower of the present invention.
Figure 8:
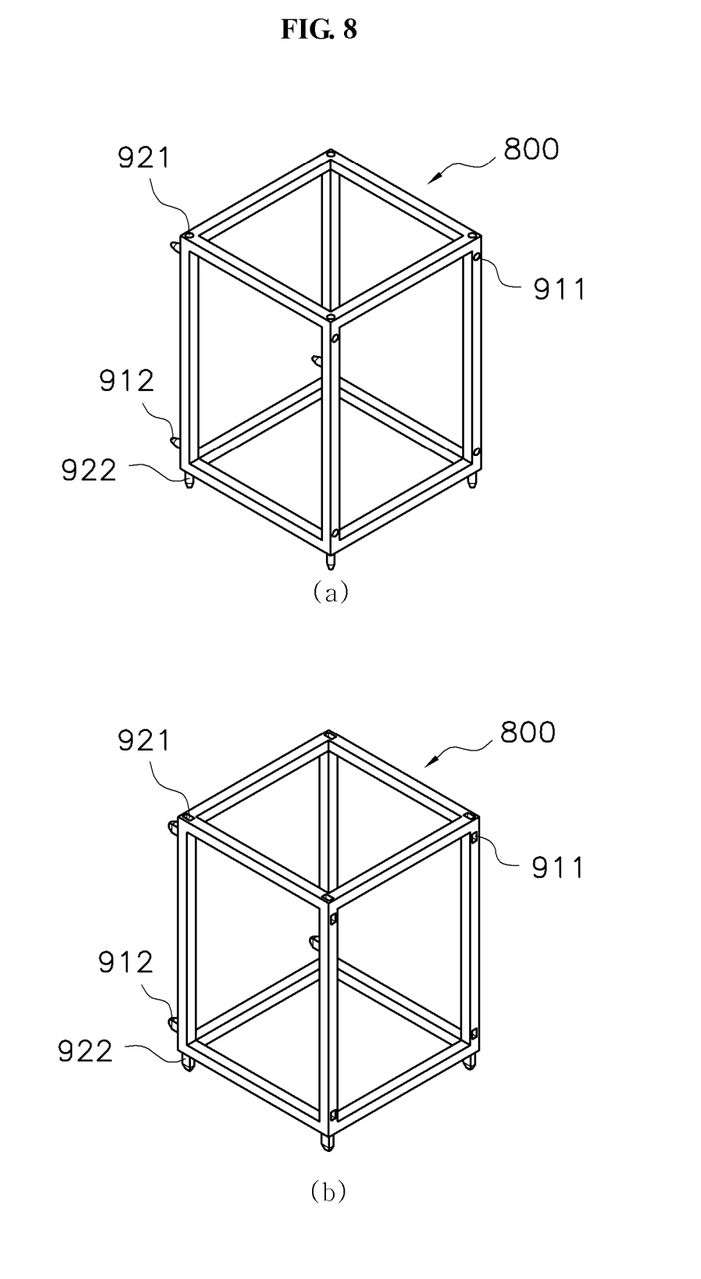
FIG. 8 is perspective views illustrating frames in the modular cooling tower of the present invention.

In addition, FIG. 7 is front cross-sectional views illustrating respective modules in the modular cooling tower of the present invention, wherein FIG. 7 (*a*) shows a third module, FIGS. 7 (*b*) and (*c*) show a second module, FIG. 7 (*d*) shows a first module, and FIG. 7 (*e*) shows a fourth module. FIG. 8 is perspective views illustrating frames in the modular cooling tower of the present invention, wherein FIG. 8 (*a*) shows horizontal coupling means and vertical coupling means having circular cross-sections, and FIG. 8 (*b*) shows horizontal coupling means and vertical coupling means having rectangular cross-sections.

Figure 9:
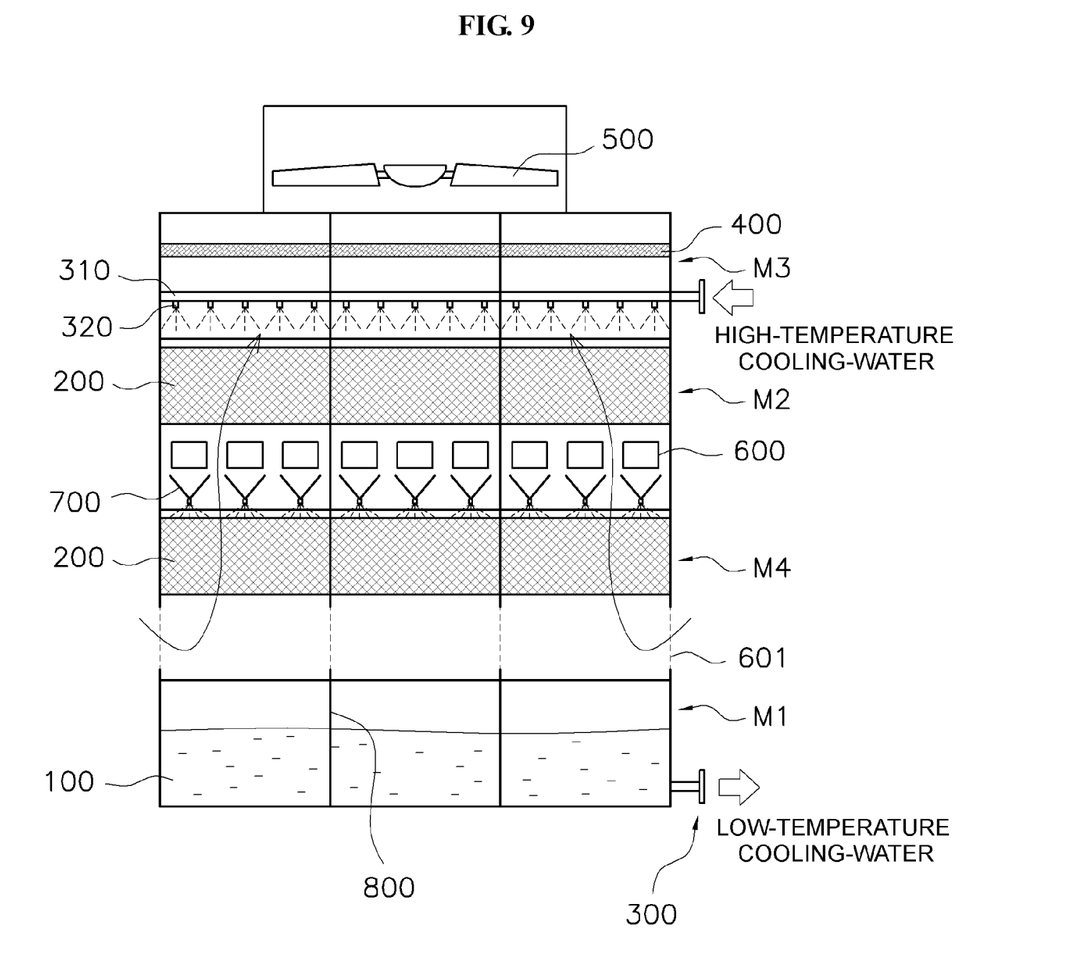
FIG. 9 is a front cross-sectional view illustrating a variant of the modular cooling tower of the present invention.

Finally, FIG. 9 is a front cross-sectional view illustrating a variant of the modular cooling tower of the present invention.

The modular cooling tower of the present invention is basically characterized in that cooling efficiency of cooling-water is improved by enabling the cooling-water to be spayed even onto a region where the cooling-water was not evenly sprayed in a conventional cooling tower, and each component is manufactured in a modularized form and then each module is integrated and installed at an installation site to correspond to the scale of the cooling tower, so that the cooling efficiency of the cooling-water can be further improved and productivity of the cooling tower as well as convenience in transportation and installation can be maximized.

Embodiments of the present invention will be described in detail below with reference to the accompanying drawings.

In a cooling tower including, when viewed upward from an installation surface as shown in FIGS. 2 and 3, a water tank 100 being capable of storing cooling-water therein, a filling material 200 for performing heat exchange between the cooling-water and air, a cooling-water circulation facility 300 provided with nozzles 320 for spraying the cooling-water downward from a pipe 310, an eliminator 400 for collecting moisture entrained in condensed air, and a fan 500 for discharging air having passed through the eliminator to the outside, a modular cooling tower of the present invention can be achieved by further including, between the filling material 200 and the water tank 100, air intake ports 600 formed in a sidewall of the cooling tower so as to allow external air to be introduced into the cooling tower; and guides 700 having a concave cross-sectional shape and installed to extend along a direction of opening of the air intake ports 600, wherein a lower surface 710 of each of the guides is configured to bisect air flowing upward and an upper surface 720 of each of the guides is configured to guide the air introduced through the air intake ports 600 to a central portion of the cooling tower by using a pressure difference between the inside and the outside of the guide.

That is, the modular cooling tower according to the present invention is technically characterized by including the air intake ports 600 and the guides 700 further provided in a cooling tower including the water tank 100, the filling material 200, the cooling-water circulation facility 300, the eliminator 400, and the fan 500.

First, in the present invention, the water tank 100 is positioned at a lowermost portion of the cooling tower and configured to have a shape of a container into which cooling-water that has completed the heat exchange falls and is collected.

The water tank 100 may be made of a metal material, and if necessary, may also be made of FRP (fiber reinforced plastic) to have both high rigidity and a light weight.

Therefore, the water tank 100 may be comprised of a bottom surface and sidewalls having a predetermined height.

The filling material 200 having a predetermined thickness is provided on an upper side of the water tank 100, and the filling member 200 is configured to allow the cooling-water to be smoothly brought into contact with external air so as to perform cooling of the cooling-water through mutual heat exchange between the cooling-water and the external air.

The filling material 200 may be largely classified into a splash type and a film type, and there would be no limitation on the type of the filling material 200 in the present invention.

The filling material 200 as described above may be manufactured by attaching several porous panels to one another in multiple layers to be approximately in a honeycomb shape.

Next, the cooling-water circulation facility 300 is configured with piping installed into a facility for performing cooling in a water-cooling manner and circulates high-temperature cooling-water, which has resulted from usage of low-temperature cooling-water in cooling a certain facility, to the cooling tower where the high-temperature cooling-water is cooled.

Of course, the cooling-water that has been cooled in the cooling tower will be repeatedly circulated.

The pipe 310 for supplying the high-temperature cooling-water is provided approximately horizontally in the cooling tower and the plurality of nozzles 320 are provided in this pipe 310, so that the high-temperature cooling-water can be flowed through the pipe 310 to the nozzles 320 that in turn spray the high-temperature cooling-water.

A direction in which the nozzles 320 spray the cooling-water will be substantially directed downward, and the plurality of the nozzles 320 are provided at an appropriate interval depending on the area of a sprayed region, so that the cooling-water sprayed by one of the nozzles 320 and by a neighboring nozzle 320 may not overlap each other while preventing occurrence of a region on which the cooling-water is not sprayed, if possible.

In addition, a separate valve (not shown) may be provided at an inlet of the pipe 310 disposed within the cooling tower, so that this valve may regulate whether the cooling-water is supplied to the pipe 310.

Therefore, for reasons of installation or other maintenance of the cooling tower or the like, it is possible to temporarily restrict the supply of the cooling-water to the pipe 310 by closing the valve.

Next, the eliminator 400 is placed above the pipe 310 of the cooling-water circulation facility 300 and collects and removes moisture, i.e., fine water particulates, entrained in air discharged to the outside.

It would be preferred that the eliminator 400 is provided with a narrow flow passage formed in a zigzag shape within the eliminator. Accordingly, the water particulates entrained in the air may adhere to a surface of the flow passage while passing through the complicatedly formed flow passage.

The fan 500 configured to discharge the air that has passed through the eliminator 400 to the outside of the cooling tower is provided above the eliminator 400. There would be no limitation on an air flow rate or the number of this fan 500. Although not shown, an axis of rotation of the fan 500 may be defined approximately vertically.

With this basic configuration of the cooling tower, the high-temperature cooling-water sprayed downward by the nozzles 320 of the cooling-water circulation facility 300 is subjected to heat exchange with external air in the filling material 200, so that cooled cooling-water is sent back to the cooling-water circulation facility 300 through the water tank 100.

Air that has been subjected to the heat exchange with the cooling-water is deprived of moisture in the eliminator 400 and then discharged to the outside of the cooling tower through the fan 500.

In particular, the present invention is technically characterized by including the air intake ports 600 and the guides 700 further provided in the aforementioned basic configuration of the cooling tower.

The air intake ports 600 are formed in sidewalls constituting the cooling tower and are through-holes formed to introduce external air into a space between the aforementioned filling material 200 and the aforementioned water tank 100.

The air intake ports 600 are formed in front and rear sides of the cooling tower as shown in FIG. 2, and the air intake ports 600 are not formed in left and right sides of the cooling tower as shown in FIG. 3.

Moreover, each of the guides 700 is formed to extend along a direction of opening of each of the air intake ports 600 and is installed by connecting both ends of the guide 700 to the front and rear sides of the cooling tower as shown in FIG. 3.

The shape of the air intake port 600 would not be limited to a shape such as a circle or a quadrangle. As illustrated in the figure, however, a rectangle with long sides horizontally disposed and short sides vertically disposed would be most preferable.

Of course, it may also be possible to chamfer corners of the air intake ports 600 having a rectangular cross-section or to round the corners to have an appropriate radius.

Below each of the air intake ports 600 formed as such, the guide 700 is provided to extend along the direction of opening of the air intake port 600.

The guide 700 has an approximately concave cross-sectional shape and the cross-sectional shape would not be limited to a V-shape, U-shape or the like. However, it is desirable that the guide has a depth enough to enable external air to flow thereinto.

The guide 700 having an approximately V-shaped cross section is illustrated in the figures, and this guide 700 may be formed by bending one flat panel into a V-shape or by mutually welding two flat panels into a V-shape.

Accordingly, the lower surface 710 of the guide 700 serves to bisect air that flows in the upward direction as shown in FIG. 5, and the upper surface 720 of the guide serves to guide air, which has been introduced through the air intake ports 600 into the cooling tower, the approximately central portion of the cooling tower.

The operation of the upper surface 720 of the guide 700 for guiding the air, which has been introduced through the air intake ports 600, to the central portion of the cooling tower will be described as follows.

First, when external low-temperature air is introduced through each of the air intake ports 600 formed in the sidewalls of the cooling tower as indicated by an arrow in FIG. 4, the low-temperature air flows downward and then reaches the upper surface 720 of the guide 700.

At this time, since high-temperature air is flowing upward in the cooling tower as shown in FIG. 5, the high-temperature air that is flowing upward branches off by the lower surface 710 of the guide 700 and then flows upward as indicated by an arrow ⓐ.

As a result, since velocity of the high-temperature air flowing upward beside the lower surface 710 of the guide 700 is higher than that of the low-temperature air inside the upper surface 720 of the guide 700, the low-temperature air inside the guide 700 does not escape directly and vortexes are generated therein due to a pressure difference.

In other words, most of the low-temperature air inside the guide 700 re-enters the guide 700 due to the vortexes as indicated by an arrow ⓑ in FIG. 5, and only some of the low-temperature air inside the guide 700 may flow out of the guide 700 as indicated by an arrow ⓒ in FIG. 5.

Accordingly, the low-temperature air inside the upper surface 720 of the guide 700 can advance from the sidewalls toward the central portion of the cooling tower due to the vortexes generated symmetrically with respect to a central vertical line of the guide 700 as illustrated in FIG. 5.

Therefore, even without forming the guide 700 into a duct shape having a closed cross section or without an additional component such as a separate cover, it is possible to smoothly supply the low-temperature air from the sidewalls to the central portion only by using the pressure difference between the inside and the outside of the guide.

However, as the aforementioned guide 700 is additionally provided in the present invention, there is a possibility that due to the guide 700, the cooling-water does not evenly reach a region below the guide 700.

In order to address this problem, it is preferable in the present invention that the guide 700 is additionally provided with a spraying means 730 for spraying cooling-water, which falls into the inside of the guide 700 and is collected by the upper surface 720, to the region below the lower surface 710 as shown in FIGS. 4-6.

That is, the guide 700 would collect the cooling-water falling into the inside of the guide, and it would be necessary to discharge the cooling-water collected on the upper surface 720 of the guide 700 to the outside of the guide 700.

According to the present invention, however, there is no need to separately discharge the cooling-water that is inside the guide 700, and it is possible to use the cooling-water inside the guide 700 so as to spray the cooling-water onto the region below the guide by the spraying means 730 such as an additional nozzle.

It would be preferable that a flow rate sprayed by the spraying means 730 is designed to enable the cooling-water to be properly sprayed in proportion to the size of the guide 700 such that the cooling-water is not lacked or does not overflow inside the guide 700.

In particular, it would be preferable in the present invention that the spraying means 730 sprays the cooling-water onto a rectangular or elliptical spray region "A" having a major axis parallel to the installation direction of the guide 700.

That is, the spraying means 730 would generally spray the cooling-water onto a predetermined circular region.

However, in the present invention, the shape of a nozzle hole is designed such that the spray region "A" onto which the spraying means 730 sprays the cooling-water is formed in a rectangular shape or an elliptical shape as illustrated in FIG. 6, and in particular, this rectangular or elliptical spray region "A" is arranged parallel with the installation direction of guide 700 described above.

Accordingly, it is possible for the spraying means 730 to locally spray the cooling-water only to a region where the cooling-water has not reached due to the guide 700 arranged in a longitudinal direction.

Hereinbefore, description has been made for the configuration for guiding external air from the sidewalls to the central portion or for supplying the cooling-water to the region where the cooling-water does not reach due to the guide 700 in the cooling tower of the present invention, although modularization of the cooling tower of the present invention will be described below.

In other words, as illustrated in FIGS. 7 and 8, it is preferable that the modular cooling tower of the present invention includes at least one first module M1 including a quadrilateral pillar-shaped frame 800 and having the water tank 100 constructed in a segmented form in the frame; at least one second module M2 including a quadrilateral pillar-shaped frame 800 and having the filling material 200, the guides 700 and the air intake ports 600 provided in the frame; and at least one third module M3 including a quadrilateral pillar-shaped frame 800 and having the cooling-water circulation facility 300 constructed in a segmented form and the eliminator 400 in the frame.

All the first module M1, the second module M2, and the third module M3 basically include the quadrilateral pillar-shaped frame 800 as illustrated in FIG. 8.

The frame 800 constitutes a skeleton of each of the modules, and it is possible that a manufacturer fabricates the modules by mounting various components into the frame and the modules are transferred to an installation site and then easily coupled to one another to complete the cooling tower.

FIGS. 2 and 3 show 3×3 modules arranged in left-and-right and front-and-rear directions, although depending on the cooling capacity of the cooling tower required for the cooling-water, 2×2, 3×3 or more modules laterally connected with one another may form one layer.

For example, 4×3 modules arranged in the left-and-right direction and the front-and-rear direction, respectively, may be connected with one another to provide a total of twelve (12) modules in one layer.

Alternatively, 5×6 modules arranged in the left-and-right direction and the front-and-rear direction, respectively, may be connected with one another to provide a total of thirty (30) modules in one layer, and so forth.

FIGS. 2 and 3 illustrate that 3×3 modules arranged in the left-and-right direction and the front-and-rear direction, respectively, are connected with one another to provide a total of nine (9) modules in one layer.

To this end, it would be preferable that the frames 800 for the respective modules are manufactured identically by standardizing the frames as to have predetermined width, depth, and height dimensions.

Of course, it would be also possible to manufacture the frames 800 to have the same width and depth dimensions but different height dimensions, if necessary.

For example, in FIG. 7, the frame 800 constituting the first module M1 and the frame constituting the third module M3 have the same height, so that the first module M1 and the third module M3 may share the frame 800.

However, the frame 800 constituting the second module M2 may have a height slightly greater than that of the first module M1 or the third module M3.

Such setting of different heights depending on the modules may be properly designed according to the number or sizes of components to be mounted in the respective modules.

Therefore, as for the respective modules, it would be also possible to manufacture the modules by using the frames 800 having the standardized same width and depth dimensions but different height dimensions, if necessary.

After the frame 800 suitable for each of the modules is standardized and manufactured, components required for each of the modules may be mounted into the frame 800.

That is, a first module M1 illustrated in FIG. 7 (d) is positioned at the lowermost portion of the cooling tower and includes a water tank 100 in a segmented form.

The first module M1 may be made by forming steel sidewalls on all lateral four (4) sides of a frame 800 and subsequently forming connection holes at lower portions of the sidewalls, so that even if a plurality of first modules M1 are horizontally connected with one another, the first modules may share their water tanks 100.

Alternatively, for example, it is possible to make a water tank 100 from an FRP material with a size to fit the cross-sectional area of one frame 800, and to allow lower portions of water tanks 100 of a plurality of first modules M1 to be communicated with one another upon connection of the first modules.

If necessary, it is also possible that an FRP water tank 100 is manufactured to have a large area which is the same as the area of one layer defined by connection of a plurality of first modules M1 with one another, the FRP water tank is divided into water tank segments of which number corresponds to the number of the modules to be connected, and the water tank segments are then installed in the respective first modules M1.

In the case where the water tank 100 is divided into several water tank segments as such, it may be necessary to connect the water tank segments with one another at an installation site.

Next, each of second modules M2 illustrated in FIGS. 7 (b) and (c) can be stacked on an upper side of the first module M1.

If necessary, these second modules M2 may be stacked in two layers as illustrated in FIGS. 2 and 3 depending on the cooling capacity of the cooling tower.

For these second modules M2, the filling material 200, the guides 700, and the air intake ports 600 as described above are provided in a frame 800.

The filling material 200 and the guides 700 may be made in the form of segments matching with the frame 800, respectively, and the air intake ports 600 may be then formed on upper sides of the respective guides 700.

Even in the case where the guides 700 are made in the form of the segments, it may be necessary to connect the segments with one another at an installation site.

FIG. 7 (b) shows the second module M2 provided with the spraying means 730 at lower portions of the guides 700, and FIG. 7 (c) shows the second module M2 without the spraying means 730 provided at the lower portions of the guides 700.

For example, the cooling tower of the present invention may include the second modules M2 arranged in two or more layers as shown in FIGS. 2 and 3, if necessary, and accordingly, the upper second module M2 requires the spraying means 730 but the lower second module M2 does not require the spraying means 730.

Therefore, it is possible that the two types of second modules M2 are manufactured, and the second module M2 with the spraying means 730 is disposed on an upper side and the second module M2 without the spraying means is disposed at a lower side to form the double-layered second modules M2, thereby constructing the cooling tower.

Of course, it is also possible to stack the second modules M2 in three or more layers depending on required cooling performance.

In addition, although not shown separately, it would also be possible that the guides 700 are excluded from the lower second module M2, if necessary, and a fourth module M4 obtained by modifying the second module M2 as illustrated in FIG. 7 (e) is employed between the first module M1 and the second module M2 as illustrated in FIG. 9.

In the variant of the modular cooling tower according to the present invention illustrated in FIG. 9, the fourth module M4 has a configuration in which a frame 800 is filled with only the filling member 200 and only air intake ports 601 having a relatively large area are formed below the filling material 200.

With this configuration, as shown in FIG. 9, external air introduced through the air intake ports 601 of the fourth module M4 may be subjected to primary heat exchange while passing through the filling material 200 provided in the fourth module M4, and subsequently to secondary heat exchange while passing through the second module M2, thereby performing the operation described above.

Moreover, the third module M3 is stacked on an upper side of the aforementioned second module M2 and includes a cooling-water circulation facility 300 in a segmented form.

That is, a segmented pipe 310 of the cooling-water circulation facility 300 is arranged across a frame 800 in the third module M3, and a plurality of nozzles 320 are disposed on the pipe 310.

It may also be necessary to connect a plurality of segmented pipes 310 formed as above with one another at an installation site. If a mechanical element such as a quick coupler is employed, the segmented pipes 310 can be easily connected with one another.

In addition, in the present invention, it is preferred that the first module M1, the second module M2, and the third module M3 include horizontal coupling means for allowing two or more first modules, second modules, or third modules arranged in a horizontal direction to be couplable to one another; and the first module M1, the second module M2, and the third module M3 include vertical coupling means for allowing the first module, the second module, and the third module arranged on top of another in a vertical direction to be couplable to one another.

For example, a variety of well-known connection members consisting of a pair of male and female pieces may be employed as the horizontal or vertical coupling means, and preferably have configurations capable of easily connecting the quadrilateral pillar-shaped frames 800 with one another.

Additionally, it would be more preferable that these coupling means have configurations for securing mutually connected states or for enabling easy disconnection.

FIG. 8 (a) illustrates that horizontal coupling recesses 911 and horizontal coupling protrusions 912 are provided as one example of the horizontal coupling means, and vertical coupling recesses 921 and vertical coupling protrusions 922 are provided as one example of the vertical coupling means, wherein the recesses and the protrusions have circular cross-sections.

In other words, it would be preferable that the two or more horizontal coupling protrusions 912 protrude approximately horizontally and in the shape of a cylinder, which is tapered with a tip having a smaller cross-section, on a lateral side of the frame 800, so that the horizontal coupling protrusions can be easily inserted into the horizontal coupling recesses 911 of a neighboring frame 800.

In addition, it is preferable that the vertical coupling protrusions 922 protrude approximately vertically and in the shape of a cylinder, which is tapered with a tip having a smaller cross-section, on a bottom side of the frame 800, so that the vertical coupling protrusions can be easily inserted into the vertical coupling recesses 921 of a neighboring frame 800.

The frame of FIG. 8 (b) is different from the frame of FIG. 8 (a) in that the horizontal coupling protrusions 912 and the vertical coupling protrusions 922 are formed in a quadrilateral pillar shape with a rectangular cross-section and the horizontal coupling recesses 911 and the vertical coupling recesses 921 are accordingly formed to have a rectangular cross-section.

However, if the cross-sections of the horizontal coupling means or the vertical coupling means are not formed in a circular shape but formed in a rectangular shape having directionality as shown in FIG. 8 (b), it is greatly advantageous in that the frame 800 can be prevented from being assembled in an incorrect direction at an installation site of the cooling tower.

Although the horizontal coupling means or the vertical coupling means constructed to have the male and female pieces are exemplified above, it is not limited thereto and various other mechanical elements may be employed.

With the modularization according to the present invention as described above, when a large-capacity cooling tower is required, respective modules are manufactured by a manufacturer, the relatively small modules can be easily transported, and the modules are assembled together at an installation site, whereby even the large-capacity cooling tower can be conveniently installed according to a required cooling capacity.

Hereinafter, the operation of the present invention will be described below with reference to the drawings.

In the modular cooling tower of the present invention configured as described above, one or more first modules M1, one or more second modules M2, and one or more third modules M3 are manufactured by a manufacturer, respectively, as shown in FIG. 7 and then easily transported to an installation site where the modules can be installed simply by arranging them in the vertical direction and in the left-and-right direction.

The fourth module M4 obtained by modifying the second module M2 may be stacked between the first module M1 and the second module M2.

Modules disposed at the same level, i.e., in the same layer, are connected with one another by the horizontal coupling means, and modules disposed on the same vertical line are connected with one another by the vertical coupling means, so that the operations for connecting the modules to one another may be conveniently performed within a short time.

In addition, since the modular cooling tower of the present invention is provided with the air intake ports 600 and the guides 700, it is possible to supply low-temperature air, which is introduced through the air intake ports 600, to the central portion of the cooling tower by the guides 700, so that high efficiency of heat exchange may be obtained.

Furthermore, the guides 700 are provided with the separate spraying means 730 to spray the cooling-water, which has fallen into the insides of the guides 700, to regions below the guides, so that the cooling-water may be evenly sprayed even to the regions covered with the guides 700, thereby achieving high efficiency of heat exchange.

Therefore, the aforementioned modular cooling tower of the present invention has great advantages in that the cooling efficiency of the cooling-water is improved by enabling the cooling-water to be spayed even onto a region where the cooling-water was not evenly sprayed in a conventional cooling tower, and each component is manufactured in a modularized form and then each module is integrated and installed at an installation site to correspond to the scale of the cooling tower, so that the cooling efficiency of the cooling-water can be further improved and productivity of the cooling tower as well as convenience in transportation and installation can be maximized.

The foregoing embodiments are examples only for the purpose of specific illustration of the spirit of the present invention. The scope of the present invention is not limited to the embodiments or accompanying drawings.

The invention claimed is:

1. A modular cooling tower comprising, when viewed upward from an installation surface, a water tank being capable of storing cooling-water therein, a filling material for performing heat exchange between the cooling-water and air, a cooling-water circulation facility provided with nozzles for spraying the cooling-water downward from a pipe, an eliminator for collecting moisture entrained in condensed air, and a fan for discharging air having passed through the eliminator to the outside, the modular cooling tower being characterized by further comprising: between the filling material and the water tank,
    air intake ports formed in a sidewall of the cooling tower so as to allow external air to be introduced into the cooling tower; and
    guides having a concave cross-sectional shape and installed to extend along a direction of opening of the air intake ports, wherein a lower surface of each of the guides is configured to bisect air flowing upward and an upper surface of each of the guides is configured to guide the air introduced through the air intake ports to a central portion of the cooling tower by using a pressure difference between the inside and the outside of the guide.

2. The modular cooling tower of claim 1, wherein each of the guides is further provided with spraying means for spraying the cooling-water falling into the inside of the guide and collected by the upper surface to a region below the lower surface of the guide.

3. The modular cooling tower of claim 2, wherein the spraying means are configured to spray the cooling-water to rectangular or elliptical spray regions having major axes parallel to the installation direction of the guides.

4. The modular cooling tower of claim 3, comprising:
   at least one first module including a quadrilateral pillar-shaped frame and having the water tank constructed in a segmented form in the frame;
   at least one second module including a quadrilateral pillar-shaped frame and having the filling material, the guides and the air intake ports provided in the frame; and
   at least one third module including a quadrilateral pillar-shaped frame and having the cooling-water circulation facility constructed in a segmented form and the eliminator in the frame.

5. The modular cooling tower of claim 4, wherein the first module, the second module, and the third module comprise horizontal coupling means for allowing two or more first modules, second modules, or third modules arranged in a horizontal direction to be couplable to one another; and
   the first module, the second module, and the third module comprise vertical coupling means for allowing the first modules, second modules, and third modules arranged on top of another in a vertical direction to be couplable to one another.

* * * * *